UNITED STATES PATENT OFFICE.

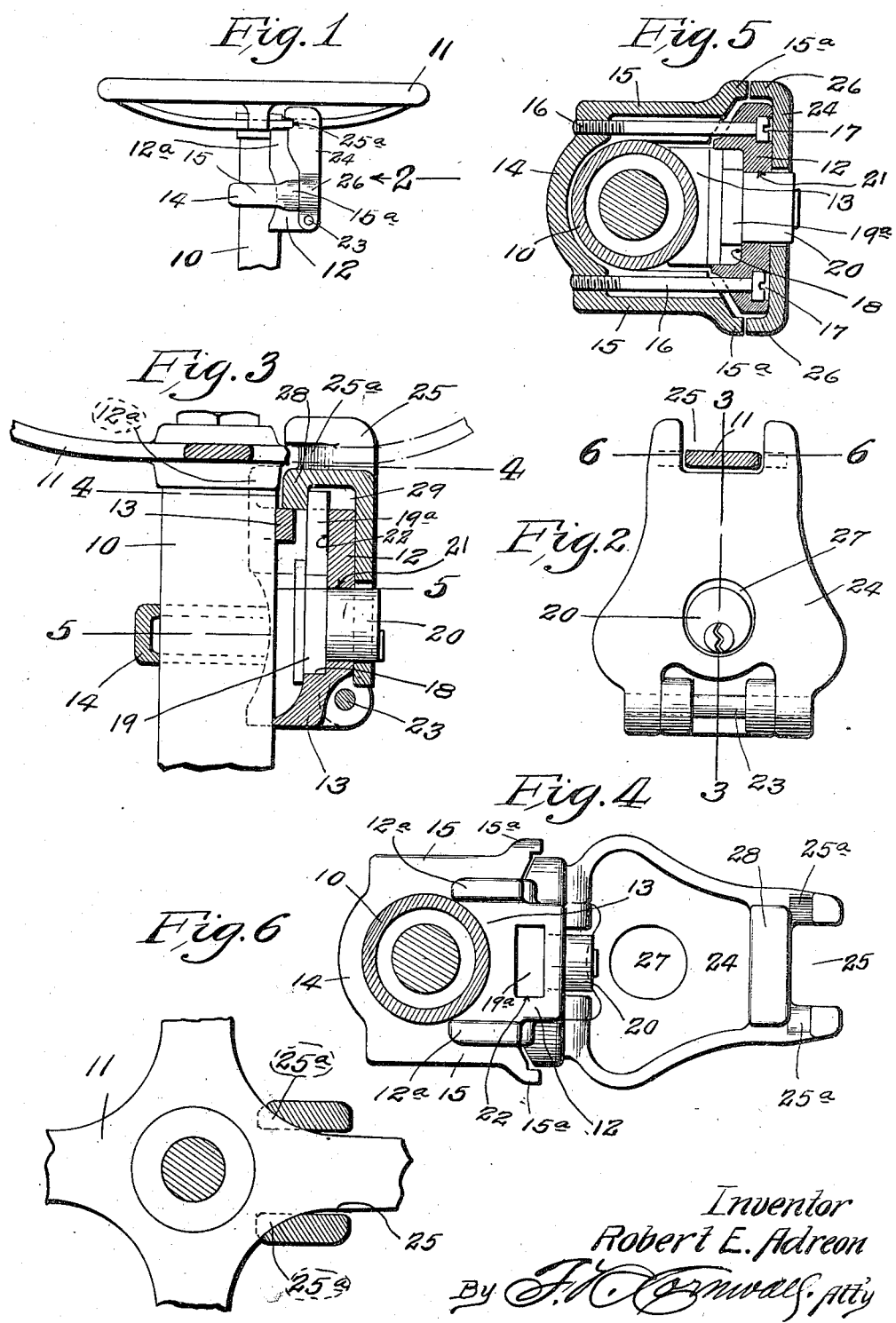

ROBERT E. ADREON, OF ST. LOUIS, MISSOURI.

AUTOMOBILE-STEERING-WHEEL LOCK.

1,300,804.

Specification of Letters Patent.    Patented Apr. 15, 1919.

Application filed September 21, 1918. Serial No. 255,128.

*To all whom it may concern:*

Be it known that I, ROBERT E. ADREON, a citizen of the United States, residing at the city of St. Louis, State of Missouri, have invented a certain new and useful Improvement in Automobile-Steering-Wheel Locks, of which the following is a full, clear, and exact description, such as will enable others skilled in the art to which it appertains to make and use the same, reference being had to the accompanying drawings, forming part of this specification.

My invention relates generally to locking devices for the steering wheels of automobiles, and particularly to that type of lock disclosed in United States Letters Patent No. 1,270,088, granted to me June 18, 1918, the principal object of my present invention being to generally improve upon the construction disclosed in said patent.

Further objects of my invention are, to provide a relatively simple locking device having comparatively few parts so that it can be easily and cheaply manufactured, to provide a lock which can be firmly secured or anchored to the steering post adjacent to the steering wheel, the securing means being wholly inaccessible when the lock is in wheel engaging position, thereby making it practically impossible, by the use of ordinary implements, to remove the lock from the steering post, and further, to provide a locking device with a standard type of lock the bolt of which is controlled by tumblers or the like and operated by means of a key or permutation disk, thus eliminating the necessity for each lock owner equipping his locking device with an extraneous locking element, such as a padlock, and which latter, it will be understood, can be readily mislaid or lost when removed from the locking device.

With the foregoing and other objects in view, my invention consists in certain novel features of construction and arrangement of parts hereinafter more fully described and claimed and illustrated in the accompanying drawings, in which—

Figure 1 is an elevational view of the upper portion of a steering post with the steering wheel thereon and showing a steering wheel lock of my improved construction applied thereto.

Fig. 2 is an enlarged elevational view taken looking in the direction indicated by the arrow 2 of Fig. 1.

Fig. 3 is an enlarged vertical section taken approximately on the line 3—3 of Fig. 2.

Fig. 4 is an enlarged horizontal section taken approximately on the line 4—4 of Fig. 3 and showing the locking arm swung downward out of its wheel-engaging position.

Fig. 5 is a horizontal section taken approximately on the line 5—5 of Fig. 3.

Fig. 6 is a horizontal section taken approximately on the line 6—6 of Fig. 2.

Referring by numerals to the accompanying drawings, 10 designates the tubular steering post or column which serves as a housing for the usual steering shaft, the latter carrying at its upper end a steering wheel 11, the same having a bearing on the upper end of post 10.

Positioned upon the post 10 at a point slightly below the bearing for the hub of the steering wheel, is a block 12, preferably of cast metal, and provided at its top and bottom with flanges 13, the rear or outer edges of which are transversely curved to form seats or bearings which engage directly against the surface of post 10. A substantially U-shaped member 14, preferably cast, is positioned upon post 10 directly opposite block 12, and the ends of the legs 15 of said U-shaped member bear directly against the rear or inner face of block 12 and at points between the flanges 13 on the latter. Passing through suitably formed apertures in the sides of block 12 are screws 16 the threaded ends of which are seated in suitably located threaded apertures in U-shaped member 14. The heads of these screws 16 occupy countersunk recesses 17, the same being formed in the front or outer face of block 12. Obviously when these screws 16 are tightened, block 12 and U-shaped member 14 will be drawn toward each other, thereby firmly gripping the steering post 10 and consequently securing said block 12 in rigid position upon said post.

Formed integral with the outer portions of the ends of the legs 15 of member 14 are ears or flanges 15ª which, when the parts are properly assembled, overlie adjacent portions on the sides of block 13, thus serving as a protection for the joint between the ends of said legs 15 and member 13 and preventing the insertion of a tool such as a saw or chisel which might be inserted in the joint by an unauthorized person in an attempt to sever one of the bolts 16.

Formed in the inner face of block 12 between the flanges 13, is a recess 18 in which is positioned the housing 19 of a standard form of lock, preferably of the barrel type, and the body or barrel 20 of this lock projects outwardly through an aperture 21 formed in the central portion of said block. This lock may be of any desired type, although I prefer to use a form of lock readily obtainable in the open market and which is operated by means of a key or permutation disk. In the event that a key-operated lock is utilized in connection with my improved locking device, it is desirable that said lock be of the type wherein the key can only be removed when the bolt of the lock is shifted into locking position, for by such provision it will be incumbent upon the owner of the lock to swing the plate 24 into wheel engaging position and then turn the key before he can remove same from the barrel.

The bolt 19ª of the lock is adapted to be projected upwardly from the barrel 20 through a suitably formed aperture 22 in the upper portion of block 12, and the upper end of said bolt when projected to its limit of movement extends a substantial distance above the top of said block (see Fig. 3).

Hinged upon a transversely disposed pin 23 which is seated in the lower portion of block 12, is the lower end of a plate 24, the free end thereof being notched or bifurcated, as designated by 25, so as to receive one of the spokes of the steering wheel 11 when said plate is swung upwardly into locking position. Formed integral with the sides of the lower portion of this plate are rearwardly projecting flanges 26 which overlie the side edges of the block 12 and particularly those portions of the block in which the heads of screws 16 are seated. Thus when the plate 24 is in wheel engaging position, the heads of the screws 16 are inaccessible, consequently it is practically impossible to remove said screws or loosen the same a sufficient degree to permit the members 12 and 14 to be slipped downward on the steering post so as to disengage plate 24 from the steering wheel.

Formed in the inner faces of the legs or portions of plate 24 and to the sides of the bottom of the notch 25 are horizontally disposed notches or recesses 25ª which, when plate 24 is swung upwardly into wheel engaging position, engage the webs which are formed on the sides of the spokes of the steering wheel at the inner ends thereof. (See Fig. 6). Thus, when plate 24 is locked in wheel engaging position, the steering wheel will be effectually locked against both rotary motion and upward movement with respect to the steering post by virtue of the fact that one of the spokes is positioned in notch 25 and further by the engagement of the webs at the inner ends of the engaged spoke in the horizontally disposed recesses 25ª. It is just as essential to lock the steering wheel against upward movement relative to the steering post as it is to lock it against rotary movement, for it will be understood that if it is not so locked, it would be possible for a thief or unauthorized person to remove the nut on top of the steering post, pull the steering wheel upwardly and then engage the steering post with a wrench or like tool and thus rotate said post and steer the vehicle. Thus the locking plate provided with the vertical notch 25 and laterally disposed notches 25ª is effective in locking the steering wheel against both rotary and vertical movement.

Formed in plate 24 is an aperture 27 through which the outer portion of the barrel 20 of the lock projects when said plate is in wheel engaging position. Projecting rearwardly from the plate 24 immediately below notch 25 is a lug 28 in the underside of which is formed a recess 29, which latter receives the end of bolt 19ª when the latter is projected outwardly into locking position.

In order to cover the horizontally disposed joint between the underside of lug 28 and top of block 12, ears 12ª are formed on the upper end of said block 12 at the sides thereof and when the plate 24 is swung upward into wheel engaging position, lug 28 is positioned between these ears with the result that it will be practically impossible for an implement of any kind to be inserted between said lug and the top of block 12.

When my improved device is utilized for locking the steering wheel, the latter is turned so as to bring one of its spokes into position directly above the block 12 after which plate 24 is swung upward so that the spoke occupies a position in notch or recess 25, and with the webs at the inner end of said spoke seated in the notches 25ª. The key of lock 20 is now turned to project bolt 19ª upwardly into the pocket or recess 29 and thus the plate 24 will be effectually locked in wheel engaging position and it will be impossible to rotate the steering wheel in either direction or to move said wheel upwardly a sufficient distance to disengage it from said locking plate.

A locking device of my improved construction is comparatively simple, is composed of but few parts, occupies a position convenient to the hands of the driver of the vehicle, and provides effective means for locking the steering wheel of the vehicle against rotary movement in either direction. Further, by providing the locking device with a standard form of lock, the necessity for an extraneous locking device, such as a padlock, is obviated, and the use of a lock which will not permit the removal of the key while the bolt of the lock is retracted, insures the movement of the locking plate 24 into wheel engaging position before the key can be removed from the barrel of the lock.

Obviously, my improved locking device can be advantageously employed in connection with practically all forms of automobiles, motor boats, trucks, and tractors or any vehicle which is guided by means of a hand or steering wheel.

It will be readily understood that minor changes in the size, form and construction of the various parts of my improved automobile steering wheel lock may be made and substituted for those herein shown and described, without departing from the spirit of my invention, the scope of which is set forth in the appended claims.

I claim:

1. In a locking device of the class described, a member adapted to be secured to the steering column of a motor vehicle adjacent to the steering wheel, an arm hinged to said member, the free end of which arm is notched so as to receive one of the spokes of the steering wheel when swung upward into locking position, there being laterally disposed notches formed in said arm to the sides of the spoke engaging notch, which laterally disposed notches are adapted to receive the side portions of the engaged spoke to retain the same against upward movement, and means on said member for locking said arm in wheel engaging position.

2. In a locking device of the class described, a member adapted to be secured to the steering column of a motor vehicle adjacent to the steering wheel, and an arm hinged to said member, the free end of said arm being provided with a notch adapted to receive one of the spokes of the steering wheel and with laterally disposed notches for receiving the webs between the inner end of the engaged spoke and the hub of said wheel.

3. In a locking device of the class described, a member adapted to be secured to the steering column of a motor vehicle adjacent to the steering wheel, a lock on said member, a portion of which lock projects forwardly from said member, an arm hinged to said member, the free end of which arm is provided with a vertically disposed notch and with laterally disposed notches which are adapted to receive one of the spokes of the steering wheel when said arm is swung upward into locking position, thereby holding said spoke and the steering wheel against both rotary and vertical movement, and said arm being provided with an aperture adapted to accommodate the projecting portion of the lock when said arm is in wheel engaging position.

4. In a locking device of the class described, a member adapted to be secured to the steering column of a motor vehicle adjacent to the steering wheel, a lock carried by said member, which lock is provided with a key receiving portion projecting forwardly from the member, an arm hinged to said member, the free end of which arm is notched so as to receive one of the spokes of the steering wheel when said arm is swung upward into locking position, said arm being provided with an interiorly arranged recess adapted to receive the bolt of the lock when said bolt is projected, and said arm being provided with an aperture for the accommodation of the projecting key receiving portion of the lock.

In testimony whereof I hereunto affix my signature this 17th day of September, 1918.

ROBERT E. ADREON.